(12) United States Patent
Hosoe et al.

(10) Patent No.: US 9,863,473 B2
(45) Date of Patent: Jan. 9, 2018

(54) SLIDING PARTS AND PROCESSING METHOD OF SLIDING PARTS

(71) Applicant: EAGLE INDUSTRY CO., LTD., Tokyo (JP)

(72) Inventors: Takeshi Hosoe, Tokyo (JP); Shinji Nishida, Tokyo (JP); Koichi Mori, Tokyo (JP); Yuta Negishi, Tokyo (JP); Hideki Kawai, Tokyo (JP); Masatoshi Itadani, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/119,715

(22) PCT Filed: Feb. 23, 2015

(86) PCT No.: PCT/JP2015/054933
§ 371 (c)(1),
(2) Date: Aug. 17, 2016

(87) PCT Pub. No.: WO2015/125950
PCT Pub. Date: Aug. 27, 2015

(65) Prior Publication Data
US 2017/0067510 A1    Mar. 9, 2017

(30) Foreign Application Priority Data
Feb. 24, 2014    (JP) .................................. 2014-033486

(51) Int. Cl.
*F16J 15/34*    (2006.01)
*B23K 26/00*    (2014.01)
(Continued)

(52) U.S. Cl.
CPC ............ *F16C 33/741* (2013.01); *B23K 26/00* (2013.01); *B23K 26/0624* (2015.10);
(Continued)

(58) Field of Classification Search
CPC ...... F16C 33/741; F16C 33/106; F16C 33/14; F16C 33/043; F16J 15/34; F16J 15/3412; B23K 26/0624; B23K 26/00
See application file for complete search history.

(56) References Cited

U.S. PATENT DOCUMENTS 5,844,149 A  *  12/1998 Akiyoshi ............. G01N 21/718
                                                                356/316
2006/0034554 A1    2/2006 Huang et al. ................. 384/100
(Continued)

FOREIGN PATENT DOCUMENTS

| JP | 2003211400 | 7/2003 | ............. B23K 26/06 |
| JP | 2005321048 | 11/2005 | ............. B23K 26/00 |

(Continued)

OTHER PUBLICATIONS

First Notification of Reason for Refusal Issued in Corresponding Chinese Patent Application Serial No. 201580009252.3 Dated Mar. 15, 2017 With English Translation (9 Pgs.).

(Continued)

*Primary Examiner* — Gilbert Y Lee
(74) *Attorney, Agent, or Firm* — Hayes Soloway P.C.

(57) ABSTRACT

The present disclosure provides a processing method for preparing at least one sliding part of a pair of sliding parts, and includes a processing step of forming a shallow groove within a range of depth from 0.05 μm to 5 μm on a sealing face of the sliding part by irradiating an ultrashort pulse laser to a part of the sealing face where a positive pressure generation groove and a negative pressure generation groove are formed and removing part of a surface of the sealing face, wherein an energy fluence of the ultrashort pulse laser used in the processing step is 0.5 J/(cm$^2$·pulse) to 7 J/(cm$^2$·pulse).

8 Claims, 11 Drawing Sheets

(51) Int. Cl.
- *F16C 33/74* (2006.01)
- *F16C 33/10* (2006.01)
- *F16C 33/14* (2006.01)
- *B23K 26/0622* (2014.01)
- *F16C 33/04* (2006.01)

(52) U.S. Cl.
CPC ............ *F16C 33/106* (2013.01); *F16C 33/14* (2013.01); *F16J 15/34* (2013.01); *F16J 15/3412* (2013.01); *F16C 33/043* (2013.01); *F16C 2220/60* (2013.01); *F16C 2240/56* (2013.01)

(56) References Cited

U.S. PATENT DOCUMENTS

| | | | |
|---|---|---|---|
| 2010/0038862 A1* | 2/2010 | Young | B23K 26/0066 277/399 |
| 2011/0298160 A1 | 12/2011 | Zaitsu et al. | 264/497 |
| 2013/0162991 A1* | 6/2013 | O'Connor | G01J 3/0291 356/317 |

FOREIGN PATENT DOCUMENTS

| | | | |
|---|---|---|---|
| JP | 2007069300 | 3/2007 | ............ B23K 26/08 |
| JP | 2009255141 | 11/2009 | |
| JP | 2011240403 | 12/2011 | ............ B23K 26/00 |
| JP | 2011242644 | 12/2011 | ............ B23K 26/08 |
| JP | 2011251320 | 12/2011 | ............ B23K 26/04 |

OTHER PUBLICATIONS

International Search Report and Written Opinion (w/translation) issued in application No. PCT/JP2015/054933, dated May 19, 2015 (19 pgs).

International Preliminary Report on Patentability (translation) issued in application No. PCT/JP2015/054933, dated Sep. 9, 2016 (10 pgs).

* cited by examiner

Fig. 4

WAVELENGTH: TEST RESULT OF 1 030 nm

| Beam size φ | Power | Fluence | depth/shot |
|---|---|---|---|
| μm | W | J/cm2 · pulse | μm |
| 46 | 50 | 15 | – |
| 46 | 40 | 12 | 0.052 |
| 46 | 30 | 9 | 0.043 |
| 46 | 20 | 6 | 0.038 |
| 46 | 10 | 3 | 0.024 |
| 72 | 50 | 6 | 0.039 |
| 72 | 40 | 5 | 0.034 |
| 72 | 30 | 4 | 0.029 |
| 72 | 20 | 2 | 0.021 |
| 72 | 10 | 1 | 0.003 |

Fig. 5

WAVELENGTH: TEST RESULT OF 515 nm

| Beam size φ | Power | Fluence | depth/shot |
|---|---|---|---|
| μm | W | J/cm2 · pulse | μm |
| 23 | 30 | 18 | — |
| 23 | 27 | 16 | — |
| 23 | 21 | 13 | 0.166 |
| 23 | 18 | 11 | 0.135 |
| 23 | 15 | 9 | 0.100 |
| 23 | 12 | 7 | 0.062 |
| 23 | 9 | 5 | 0.036 |
| 23 | 6 | 4 | 0.024 |
| 23 | 3 | 2 | 0.017 |
| 36.5 | 0.3 | 0.5 | 0.003 |
| 36.5 | 1 | 2 | 0.024 |
| 80 | 15 | 0.7 | 0.006 |

PROCESSING FACE STATE CONFIRMATION TEST

LASER PROCESSING CONDITION
LASER: PICOSECOND LASER (PULSE WIDTH < 10 ps)

EVALUATEDION ITEM  1 STATE OF PROCESSING FACE: ACCEPTABLE WHEN FACE ROUGHNESS OF THE PROCESSING FACE
  AT THE TIME OF DIGGING BY 1 $\mu$m IS Ra = 0.1 $\mu$m OR LESS
(JUDGEMENT ITEM)  2 BULGE AT EDGE OF PROCESSING PART: ACCEPTABLE WHEN A BULGE OF 0.01 $\mu$m OR MORE IS NOT CAUSED

WAVELENGTH: 1030 nm

| | FLUENCE (J/(cm2·pulse)) | | | | | | | | | | | | | | | |
|---|---|---|---|---|---|---|---|---|---|---|---|---|---|---|---|---|
| | 0.1 | 0.2 | 0.4 | 0.5 | 1 | 2 | 3 | 5 | 7 | 8 | 9 | 10 | 30 | 50 | 60 |
| STATE OF PROCESSING FACE | - | - | - | OK | OK | OK | OK | OK | OK | NG | NG | NG | NG | NG | NG |
| BULGE AT EDGE OF PROCESSING PART | OK | OK | OK | OK | OK | OK | OK | OK | OK | OK | OK | OK | OK | NG | NG |

NOTE: "-" INDICATES AN IMMEASURABLE PROCESSED ITEM

WAVELENGTH: 515 nm

| | FLUENCE (J/(cm2·pulse)) | | | | | | | | | | | | | | | |
|---|---|---|---|---|---|---|---|---|---|---|---|---|---|---|---|---|
| | 0.1 | 0.2 | 0.4 | 0.5 | 1 | 2 | 3 | 5 | 7 | 8 | 9 | 10 | 30 | 50 | 60 |
| STATE OF PROCESSING FACE | - | - | - | OK | OK | OK | OK | OK | OK | NG | NG | NG | NG | NG | NG |
| BULGE AT EDGE OF PROCESSING PART | OK | OK | OK | OK | OK | OK | OK | OK | OK | OK | OK | OK | NG | NG | NG |

NOTE: "-" INDICATES AN IMMEASURABLE PROCESSED ITEM

Fig. 6

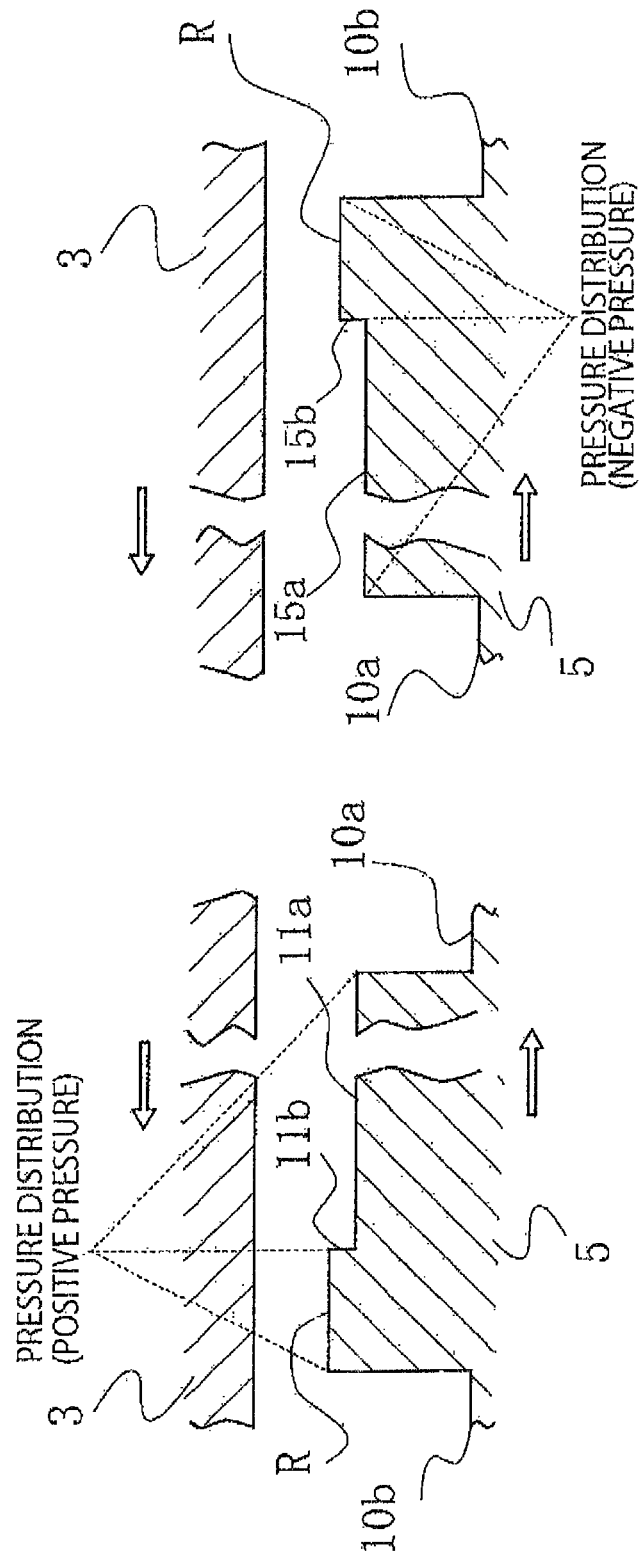

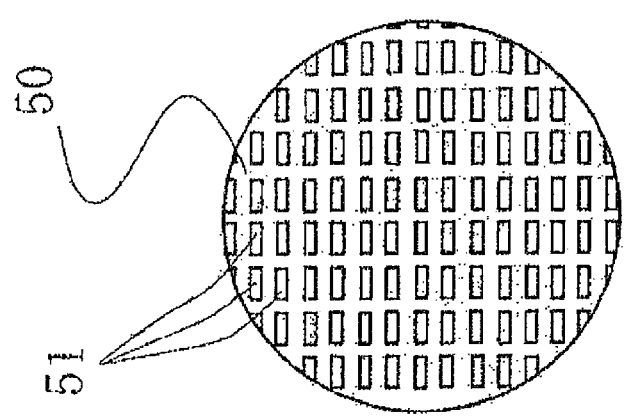
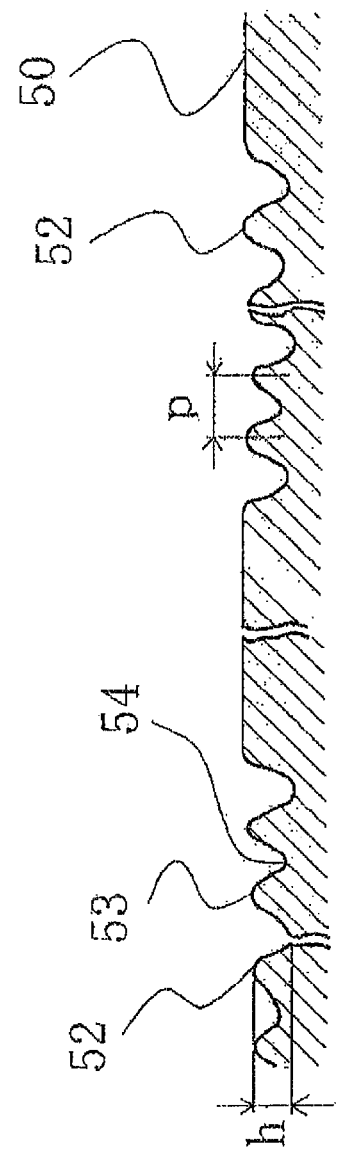
Fig.11(a)
Fig.11(b)

SLIDING PARTS AND PROCESSING METHOD OF SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In a mechanical seal serving as one example of the sliding parts, performances thereof are evaluated by a leakage amount, a wear amount, and torque. In the prior art, the performances are enhanced by optimizing sliding material and sealing face roughness of the mechanical seal, so as to realize low leakage, long life, and low torque. However, due to raising awareness of environmental problems in recent years, further improvement in the performances of the mechanical seal is required, and there is a need for technical development going beyond the boundary of the prior art.

There is a known technique in which by respectively partitioning a plurality of cyclic structures discretely formed on a sealing face by mirror face parts and damming both ends of recess parts of grating shape recesses and projections of the cyclic structures by the mirror face parts, an oil film retaining ability in the cyclic structures is increased, so that a reciprocating sliding characteristic and a rotating sliding characteristic are improved (for example, refer to Patent Citation 1. Hereinafter, the technique will be called as the "prior art").

CITATION LIST

Patent Literature

Patent Citation 1: JP2007-69300 A (FIG. 1)

SUMMARY OF INVENTION

Technical Problem

In the above prior art, as shown in FIG. 11(a), a straight polarized laser is irradiated to a plurality of discrete rectangular regions 51 of a mirror face 50 at a fluence in the vicinity of a processing threshold value, and cyclic structures are formed in a self-organized manner by scanning the irradiated part while overlapping the part. As shown in FIG. 11(b), each of the cyclic structures 52 has a projection section 53 and a recess section 54 forming grating shape recesses and projections. An average amplitude h of the grating shape recesses and projections is size substantially not exceeding 1 μm, and a cyclic pitch p of the grating shape recesses and projections of the cyclic structure 52 is size substantially not exceeding 10 μm.

An objective of the above prior art is to increase the oil film retaining ability of the sealing face, so that the reciprocating sliding characteristic and the rotating sliding characteristic are improved. Thus, the grating shape recesses and projections are formed in the cyclic structures 52 of the plurality of rectangular regions 51.

However, in a case where dynamic pressure generation grooves are formed on sealing faces of sliding parts, the sealing faces that relatively slide on each other, so as to generate positive pressure, increase a gap between the sealing faces, and hence improve a lubricating property of the sealing faces, or negative pressure generation grooves are formed on a low pressure side of the sealing faces so as to generate negative pressure and reduce leakage, bottom faces of the dynamic pressure generation grooves or the negative pressure generation grooves are desirably as flat as possible. In a case where the dynamic pressure generation grooves or the negative pressure generation grooves are formed by laser processing, debris (substances scattered from a material surface by ablation) following the laser processing are desirably not attached to the sealing faces.

An objective of the present invention is to provide sliding parts in which by forming a highly precise sealing face to which no scattering substances and the like are attached following processing of a dynamic pressure generation groove and a negative pressure generation groove formed on the sealing face and forming bottom faces of the dynamic pressure generation groove and the negative pressure generation groove formed on the sealing face to be flat, there is no need for performing a task of removing the scattering substances, and predetermined dynamic pressure and negative pressure can be generated by relative sliding of the sealing faces. Together, another objective is to provide a processing method capable of efficiently forming the dynamic pressure generation groove and the negative pressure generation groove on the sealing face with high precision.

Solution to Problem

In order to achieve the foregoing objective, a first aspect of the processing method of the sliding parts of the present invention is a processing method of sliding parts, including a step of preparing at least one sliding part of a pair of sliding parts, and a processing step of forming a shallow groove within a range of depth from 0.05 μm to 5 μm on a sealing face of the sliding part by irradiating an ultrashort pulse laser to a part of the sealing face where a positive pressure generation groove, a negative pressure generation groove, or a fluid communication passage/positive pressure generation groove is formed and removing part of a surface of the sealing face, characterized in that an energy fluence of the ultrashort pulse laser used in the processing step is 0.5 J/(cm²·pulse) to 7 J/(cm²·pulse).

According to this aspect, a bottom face serving as a processing face of the positive pressure generation groove, the negative pressure generation groove, or the fluid communication passage/positive pressure generation groove can be formed to be extremely flat, and the highly precise sealing face with no bulge due to debris at processing edges of the grooves can be obtained. Since an influence of heat following processing is small, a harmful effect such as generation of an undulation on the sealing face can be prevented. Further, since a processing time is short and there is no need for performing a task of removing the debris on the sealing face or the like after processing, working efficiency is also favorable.

A second aspect of the processing method of the sliding parts of the present invention relates to the first aspect, further including a step of changing the energy fluence of the ultrashort pulse laser.

According to this aspect, the energy fluence can be set in accordance with material of the sliding parts, and size and depth of the grooves serving as processing parts.

A third aspect of the processing method of the sliding parts of the present invention relates to the first or second aspect, characterized in that repetition frequency of the ultrashort pulse laser is 5 kHz or more.

According to this aspect, even in a case where the number of superposition of pulses is high, the processing time can be set to be a proper value.

A fourth aspect of the processing method of the sliding parts of the present invention relates to any of the first to third aspects, characterized in that pulse width of the ultrashort pulse laser is less than 10 picoseconds.

According to this aspect, generation of heat by one pulse can be reduced.

A fifth aspect of the processing method of the sliding parts of the present invention relates to any of the first to fourth aspects, characterized in that in the processing step, a shallow groove is formed on the sealing face by scanning the ultrashort pulse laser on the surface of the sealing face of the sliding part by a galvano scanner.

According to this aspect, by utilizing a high-speed scanning property of the galvano scanner, processing can be efficiently performed.

A first aspect of the sliding parts of the present invention is a pair of sliding parts including sealing faces that relatively slide on each other, characterized in that a fluid circulation groove including an inlet section where a fluid comes in from a high pressure fluid side, an outlet section where the fluid goes out to the high pressure fluid side, and a communication section that provides communication between the inlet section and the outlet section is provided in the sealing face on one side, the fluid circulation groove is isolated from a low pressure fluid side by a land section, a positive pressure generation mechanism having a position pressure generation groove shallower than the fluid circulation groove is provided in a part surrounded by the fluid circulation groove and the high pressure fluid side, the positive pressure generation groove communicates with the inlet section and is isolated from the outlet section and the high pressure fluid side by the land section, the positive pressure generation groove is a shallow groove within a range of depth from 0.05 μm to 5 μm formed by irradiation of an ultrashort pulse laser, roughness Ra of a bottom face of the positive pressure generation groove is 1/10 or less of processing depth, and a bulge due to debris at an edge of a processing part is less than 0.01 μm.

According to this aspect, in the sliding parts in which a fluid film between the sealing faces is increased and hence a lubrication performance is improved, predetermined dynamic pressure can be generated by the favorably precise positive pressure generation groove, and due to a small influence of heat at the time of processing, no undulation is generated on the sealing face and no bulge due to debris is caused. Thus, the sliding parts including the sealing faces with a favorable sealing property can be provided.

A second aspect of the sliding parts of the present invention relates to the first aspect, characterized in that a negative pressure generation mechanism including a negative pressure generation groove shallower than the fluid circulation groove is provided on an outside of the part of the sealing face on one side surrounded by the fluid circulation groove and the high pressure fluid side, the negative pressure generation groove communicates with the inlet section and is isolated from the outlet section and the low pressure fluid side by the land section, the negative pressure generation groove is a shallow groove within a range of depth from 0.05 μm to 5 μm formed by the irradiation of the ultrashort pulse laser, roughness Ra of a bottom face of the negative pressure generation groove is 1/10 or less of processing depth, and a bulge due to debris at an edge of a processing part is less than 0.01 μm.

According to this aspect, in the sliding parts in which the fluid to be leaked out to the low pressure fluid side is returned to the high pressure fluid side via the negative pressure generation groove, predetermined negative pressure can be generated by the favorably precise negative pressure generation groove. Thus, the sliding parts including the sealing faces with a furthermore favorable sealing property can be provided.

A third aspect of the sliding parts of the present invention is a pair of sliding parts including sealing faces that relatively slide on each other, characterized in that a land section for generating dynamic pressure is provided to face a high pressure fluid side and a seal area is provided to face a low pressure fluid side in the sealing face on one side, the land section and the seal area are arranged and separated from each other in the radial direction, a part of the sealing face excluding the land section and the seal area is formed to be lower than faces of the land section and the seal area as a fluid communication passage/positive pressure generation groove, the fluid communication passage/positive pressure generation groove is a shallow groove within a range of depth from 0.05 μm to 5 μm formed by irradiation of an ultrashort pulse laser, roughness Ra of a bottom face of the fluid communication passage/positive pressure generation groove is 1/10 or less of processing depth, and a bulge due to debris at an edge of a processing part is less than 0.01 μm.

According to this aspect, in the sliding parts in which a lubricating property of the sealing faces is improved, impurities contained in the fluid are discharged to the high pressure fluid side, the sealing faces are not damaged, and the impurities are not accumulated on the sealing faces to increase a gap between the sealing faces, predetermined dynamic pressure can be generated by the favorably precise fluid communication passage/positive pressure generation groove, and due to a small influence of heat at the time of processing, no undulation is generated on the sealing face and no bulge due to debris is caused. Thus, the sliding parts including the sealing faces with a favorable sealing property can be provided.

A fourth aspect of the sliding parts of the present invention relates to the third aspect, characterized in that a negative pressure generation mechanism including a negative pressure generation groove is provided on the high pressure fluid side of the seal area, a downstream side of the negative pressure generation groove communicates with the fluid communication passage/positive pressure generation groove, the negative pressure generation groove is a shallow groove within a range of depth from 0.05 μm to 5 μm formed by the irradiation of the ultrashort pulse laser, roughness Ra of a bottom face of the negative pressure generation groove is 1/10 or less of processing depth, and a bulge due to debris at an edge of a processing part is less than 0.01 μm.

According to this aspect, in the sliding parts in which the fluid to be leaked out to the low pressure fluid side is returned to the high pressure fluid side via the negative pressure generation groove, predetermined negative pressure can be generated by the favorably precise negative pressure generation groove. Thus, the sliding parts including the sealing faces with a furthermore favorable sealing property can be provided.

Advantageous Effects of Invention

The present invention exhibits the following superior effects.

(1) Since the energy fluence of the ultrashort pulse laser used in the processing step is 0.5 J/(cm²·pulse) to 7 J/(cm²·pulse), the bottom face serving as the processing face of the positive pressure generation groove, the negative pressure generation groove, or the fluid communication passage/positive pressure generation groove can be formed to be extremely flat, and the highly precise sealing face with no bulge due to debris at the processing edges of the grooves can be obtained. Since the influence of heat following processing is small, the harmful effect such as the generation of the undulation on the sealing face can be prevented. Further, since the processing time is short and there is no need for performing the task of removing the debris on the sealing face or the like after processing, the working efficiency is also favorable.

(2) By further including the step of changing the energy fluence of the ultrashort pulse laser, the energy fluence can be set in accordance with the material of the sliding parts, and the size and the depth of the grooves serving as processing parts.

(3) Since the repetition frequency of the ultrashort pulse laser is 5 kHz or more, even in a case where the number of superposition of pulses is high, the processing time can be set to be a proper value.

(4) Since the pulse width of the ultrashort pulse laser is less than 10 picoseconds, the generation of heat by one pulse can be reduced.

(5) In the processing step, the shallow groove is formed on the sealing face by scanning the ultrashort pulse laser on the surface of the sealing face of the sliding part by the galvano scanner. Thus, by utilizing the high-speed scanning property of the galvano scanner, processing can be efficiently performed.

(6) The positive pressure generation groove is the shallow groove within the range of depth from 0.05 μm to 5 μm formed by the irradiation of the ultrashort pulse laser, the roughness Ra of the bottom face of the positive pressure generation groove is 1/10 or less of the processing depth, and the bulge due to the debris at the edge of the processing part is less than 0.01 μm. Thus, in the sliding parts in which the fluid film between the sealing faces is increased and hence the lubrication performance is improved, predetermined dynamic pressure can be generated by the favorably precise positive pressure generation groove, and due to the small influence of heat at the time of processing, no undulation is generated on the sealing face and no bulge due to the debris is caused. Therefore, the sliding parts including the sealing faces with a favorable sealing property can be provided.

(7) The negative pressure generation groove is the shallow groove within the range of depth from 0.05 μm to 5 μm formed by the irradiation of the ultrashort pulse laser, the roughness Ra of the bottom face of the negative pressure generation groove is 1/10 or less of the processing depth, and the bulge due to the debris at the edge of the processing part is less than 0.01 μm. Thus, in the sliding parts in which the fluid to be leaked out to the low pressure fluid side is returned to the high pressure fluid side via the negative pressure generation groove, predetermined negative pressure can be generated by the favorably precise negative pressure generation groove. Therefore, the sliding parts including the sealing faces with a furthermore favorable sealing property can be provided.

(8) The fluid communication passage/positive pressure generation groove is the shallow groove within the range of depth from 0.05 μm to 5 μm formed by the irradiation of the ultrashort pulse laser, the roughness Ra of the bottom face of the fluid communication passage/positive pressure generation groove is 1/10 or less of the processing depth, and the bulge due to the debris at the edge of the processing part is less than 0.01 μm. Thus, in the sliding parts in which the lubricating property of the sealing faces is improved, the impurities contained in the fluid are discharged to the high pressure fluid side, the sealing faces are not damaged, and the impurities are not accumulated on the sealing faces to increase the gap between the sealing faces, predetermined dynamic pressure can be generated by the favorably precise fluid communication passage/positive pressure generation groove, and due to the small influence of heat at the time of processing, no undulation is generated on the sealing face and no bulge due to the debris is caused. Thus, the sliding parts including the sealing faces with a favorable sealing property can be provided.

(9) In the sliding parts including the fluid communication passage/positive pressure generation groove, the negative pressure generation groove is the shallow groove within the range of depth from 0.05 μm to 5 μm formed by the irradiation of the ultrashort pulse laser, the roughness Ra of the bottom face of the negative pressure generation groove is 1/10 or less of the processing depth, and the bulge due to the debris at the edge of the processing part is less than 0.01 μm. Thus, in the sliding parts in which the fluid to be leaked out to the low pressure fluid side is returned to the high pressure fluid side via the negative pressure generation groove, predetermined negative pressure can be generated by the favorably precise negative pressure generation groove. Therefore, the sliding parts including the sealing faces with a furthermore favorable sealing property can be provided.

BRIEF DESCRIPTION OF DRAWINGS

FIG. 4 illustrates a processing test result of the sliding part of the present invention showing a case where a wavelength of an ultrashort pulse laser is 1,030 nm;

FIG. 5 illustrates a processing test result of the sliding part of the present invention showing a case where the wavelength of the ultrashort pulse laser is 515 nm;

FIG. 6 is a graph illustrating an evaluation result of a state of a processing face at the time of processing at an irradiation fluence of the ultrashort pulse laser and a bulge at an edge of a processing part;

FIG. 7(a) shows a microscope photograph of the processing face; and FIG. 7(b) illustrates a section of the processing face showing roughness;

FIG. 8 illustrates a state of the processing face in a case where processing is performed by using a nanosecond laser as the pulse laser: FIG. 8(*b*) illustrates a section of the processing face showing roughness;

FIG. 10 is a view for illustrating a positive pressure generation mechanism formed from a Rayleigh step mechanism or the like, and a negative pressure generation mechanism formed from a reversed Rayleigh step mechanism or the like: FIG. 10(*a*) shows the Rayleigh step mechanism; and FIG. 10(*b*) shows the reversed Rayleigh step mechanism; and FIG. 11 is a view illustrating the prior art: FIG. 11(*a*) is a plan view; and FIG. 11(*b*) is a sectional view.

DESCRIPTION OF EMBODIMENTS

Hereinafter, with reference to the drawings, modes for carrying out the present invention will be described with examples based on embodiments. However, regarding size, material, shape, and relative arrangement of constituent parts described in the embodiments, and the like, there is no intention to limit the scope of the present invention only to those unless specifically and clearly described.

First Embodiment

Figure 1:
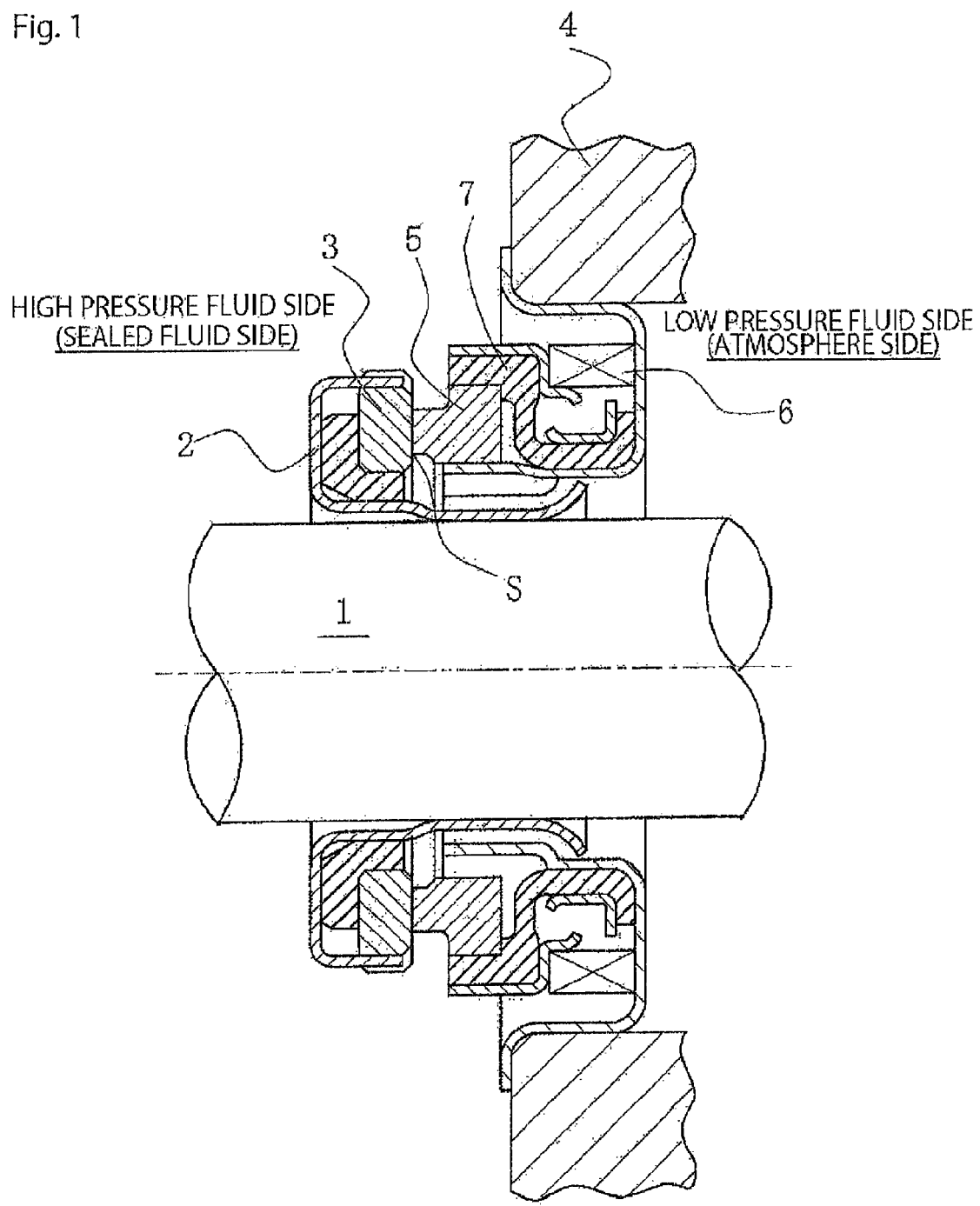
FIG. 1 is a vertically sectional view illustrating one example of a mechanical seal serving as sliding parts according to a first embodiment of the present invention.
Figure 2:
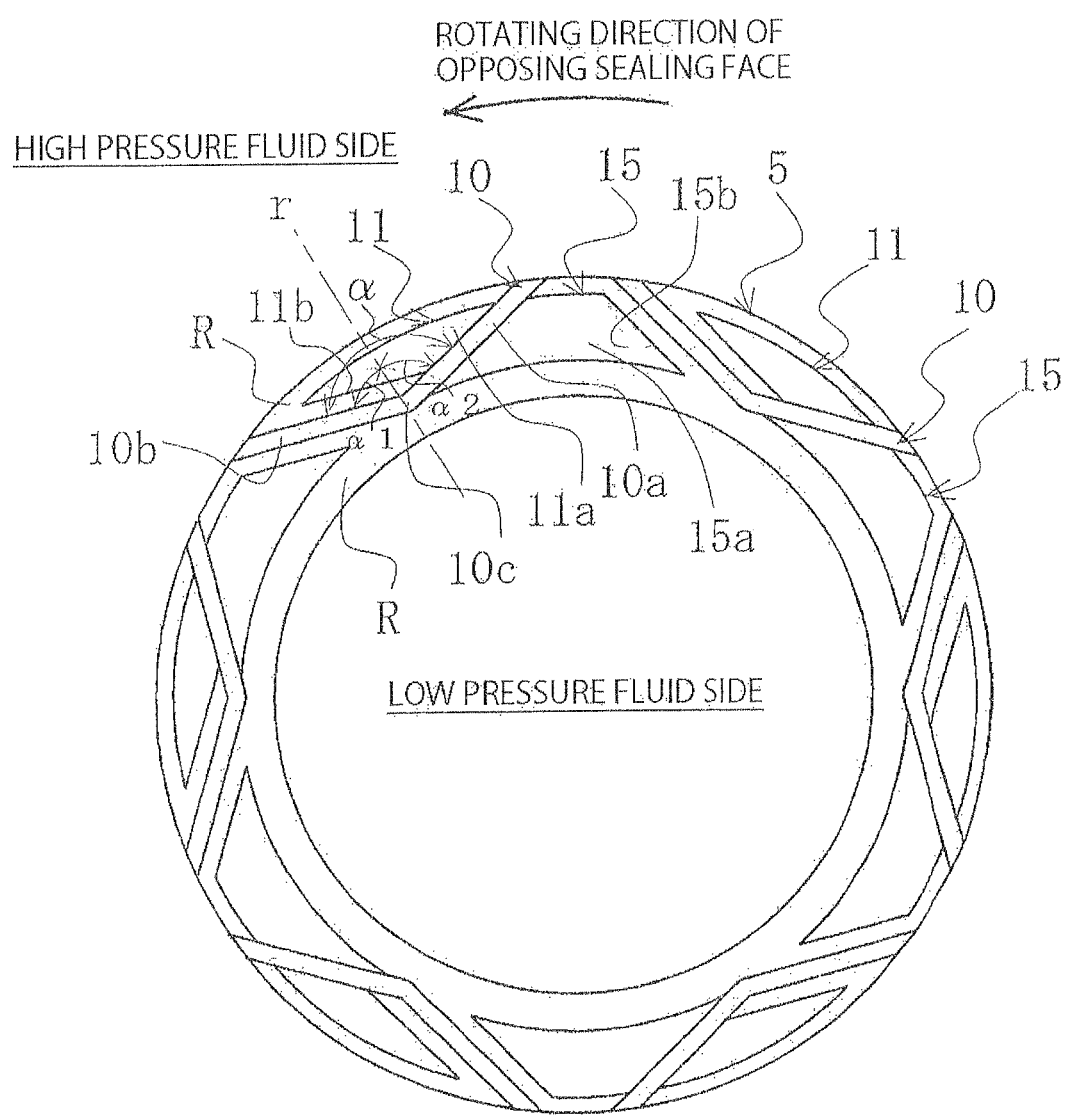
FIG. 2 illustrates a sealing face of the sliding part according to the first embodiment of the present invention.

With reference to FIGS. 1 and 2, sliding parts according to a first embodiment of the present invention will be described.

It should be noted that in the present embodiment, a mechanical seal serving as one example of the sliding parts will be described as an example. In the description, an outer peripheral side of the sliding parts that form the mechanical seal serves as a high pressure fluid side (sealed fluid side), and an inner peripheral side serves as a low pressure fluid side (atmosphere side). However, the present invention is not limited to this but can also be applied to a case where the high pressure fluid side and the low pressure fluid side are set the other way around.

FIG. 1 is a vertically sectional view showing one example of the mechanical seal that is an inside type mechanical seal for sealing a sealed fluid on the high pressure fluid side to be leaked out from an outer periphery of a sealing face toward an inner periphery. In the mechanical seal, on the side of a rotating shaft 1 that drives a pump impeller (not shown) on the high pressure fluid side, an annular rotating ring 3 serving as one of the sliding parts is provided via a sleeve 2 in a state that the rotating ring can be rotated integrally with this rotating shaft 1, an annular stationary ring 5 serving as the other sliding part is provided in a housing 4 of a pump in a state that the stationary ring is not rotated but can be moved in the axial direction, and sealing faces S mirror-finished by lapping or the like closely slide on each other by means of a coiled wave spring 6 and bellows 7 that bias the stationary ring 5 in the axial direction. That is, this mechanical seal is to prevent the sealed fluid from flowing out from an outer periphery of the rotating shaft 1 to the atmosphere side on the sealing faces S of the rotating ring 3 and the stationary ring 5.

FIG. 2 shows the sealing face of the sliding part according to the first embodiment of the present invention. A case where fluid circulation grooves are formed on the sealing face of the stationary ring 5 of FIG. 2 will be described as an example.

It should be noted that a case where the fluid circulation grooves are formed on the sealing face of the rotating ring 3 is basically similar. However, in that case, the fluid circulation grooves are only required to communicate with the sealed fluid side and hence not required to be provided up to the outer peripheral side of the sealing face.

In FIG. 2, the outer peripheral side of the sealing face of the stationary ring 5 serves as the high pressure fluid side, the inner peripheral side serves as the low pressure fluid side such as the atmosphere side, and the opposing sealing face is rotated anti-clockwise.

On the sealing face of the stationary ring 5, a plurality of fluid circulation grooves 10 that communicates with the high pressure fluid side and is isolated from the low pressure fluid side by a smooth section R (sometimes referred to as the "land section" in the present invention) of the sealing face is provided in the circumferential direction.

Each of the fluid circulation grooves 10 includes an inlet section 10*a* where the fluid comes in from the high pressure fluid side, an outlet section 10*b* where the fluid goes out to the high pressure fluid side, and a communication section 10*c* that provides communication between the inlet section 10*a* and the outlet section 10*b* in the circumferential direction, and is isolated from the lower pressure fluid side by the land section R. The fluid circulation groove 10 plays a role of actively introducing the sealed fluid onto the sealing face from the high pressure fluid side and discharging the fluid in order to prevent concentration of the fluid containing corrosion products and the like on the sealing face. The inlet section 10*a* and the outlet section 10*b* are formed in such a manner that the sealed fluid is easily taken onto the sealing face and discharged in accordance with the rotating direction of the opposing sealing face, while the fluid circulation groove is isolated from the low pressure fluid side by the land section R in order to reduce leakage.

It should be noted that a shape of the fluid circulation grooves may adopt various modes such as a substantially V shape shown in FIG. 2 or a substantially U shape, and in the present specification, in principle, the "inlet section where the fluid comes in from the high pressure fluid side" indicates a part heading off in the inner diameter direction of the fluid circulation groove, and the "outlet section where the fluid goes out to the high pressure fluid side" indicates a part heading off in the outer diameter direction of the fluid circulation groove in the description. Therefore, the "communication section that provides communication between the inlet section and the outlet section" may be extremely short or may have appropriate length.

In this example, the fluid circulation groove 10 is formed in a shape substantially left-right symmetric with respect to a radius line r of the sealing face in a plan view of the sealing face, and an intersection angle α on the high pressure fluid side made by left and right parts of the fluid circulation groove 10, that is, the inlet section 10*a* and the outlet section 10*b* is set within a range from 120° to 180°.

It should be noted that the shape of the fluid circulation groove 10 in a plan view is not necessarily a shape left-right symmetric with respect to the radius line r but an intersection angle α1 of the inlet section 10*a* may be larger than an intersection angle α2 of the outlet section 10*b* and vice versa.

In the present specification, the phrase "substantially left-right symmetric" indicates a range of α1=α2±5°.

A preferable range of the intersection angle α is a range from 120° to 180°. However, the present invention is not necessarily limited to a range from 120° to 180°.

Further, the shape of the fluid circulation groove 10 in a plan view may be formed in a curved shape (such as an arc shape) as a whole without having a linear part.

The width and the depth of the fluid circulation groove 10 may be set to be optimal in accordance with pressure, a type (viscosity), and the like of the sealed fluid.

The fluid circulation groove shown in FIG. 2 is left-right symmetric and the intersection angle α is as large as 160°. Thus, the sealed fluid easily flows into the inlet section 10a and the sealed fluid is easily discharged from the outlet section 10b.

On the sealing face in which the fluid circulation grooves 10 are provided, a positive pressure generation mechanism 11 including a positive pressure generation groove 11a that is shallower than the fluid circulation groove 10 is provided in a part surrounded by each of the fluid circulation grooves 10 and the high pressure fluid side. The positive pressure generation mechanism 11 increases a fluid film between the sealing faces by generating positive pressure (dynamic pressure), so as to improve a lubrication performance.

The positive pressure generation groove 11a communicates with the inlet section of the fluid circulation groove 10 and is isolated from the outlet section 10b and the high pressure fluid side by a land section R.

In this example, the positive pressure generation mechanism 11 is formed from a Rayleigh step mechanism including the positive pressure generation groove 11a that communicates with the inlet section 10a of the fluid circulation groove 10 and a Rayleigh step 11b. However, the present invention is not limited to this. For example, the positive pressure generation mechanism may be formed from a femto groove with a dam, that is, any mechanism that generates positive pressure.

In FIG. 2, a reversed Rayleigh step mechanism 15 forming a negative pressure generation mechanism including a groove 15a and a reversed Rayleigh step 15b which form a negative pressure generation groove shallower than the fluid circulation groove 10 is provided on an outside of a part of the sealing face of the stationary ring 5 surrounded by each of the fluid circulation grooves 10 and the high pressure fluid side, that is, between the adjacent fluid circulation grooves 10, 10. The groove 15a communicates with the inlet section 10a and is isolated from the outlet section 10b and the low pressure fluid side by the land section R.

In this first embodiment, the reversed Rayleigh step mechanism 15 forming the negative pressure generation mechanism takes the sealed fluid to be leaked out from the high pressure fluid side to the low pressure fluid side by generation of negative pressure into the groove 15a and returns the sealed fluid to the high pressure fluid side via the fluid circulation groove 10, so as to play a role of improving a sealing property.

It should be noted that the Rayleigh step mechanism and the reversed Rayleigh step mechanism will be described in detail later.

The positive pressure generation groove 11a is a shallow groove within a range of depth from 0.05 µm to 5 µm formed by irradiation of an ultrashort pulse laser. Roughness of a bottom face of the positive pressure generation groove 11a is 1/10 or less of processing depth, and a bulge due to debris at an edge of a processing part (edge of the positive pressure generation groove 11a) is less than 0.01 µm.

The negative pressure generation groove 15a is a shallow groove within a range of depth from 0.05 µm to 5 µm formed by the irradiation of the ultrashort pulse laser. Roughness of a bottom face of the negative pressure generation groove 15a is 1/10 or less of processing depth, and a bulge due to debris at an edge of a processing part (edge of the negative pressure generation groove 15a) is less than 0.01 µm.

In the present invention, the ultrashort pulse laser is a laser of very short pulses in which one pulse width (time width) is less than 10 picoseconds or several femtoseconds or more. This ultrashort pulse laser has a characteristic of instantaneously giving very large energy to substances before an effect of heat is exerted.

Next, with reference to FIG. 3, a processing method of processing the positive pressure generation groove 11a and the negative pressure generation groove 15a on the sealing face of the sliding part of the present invention will be described.

Figure 3:
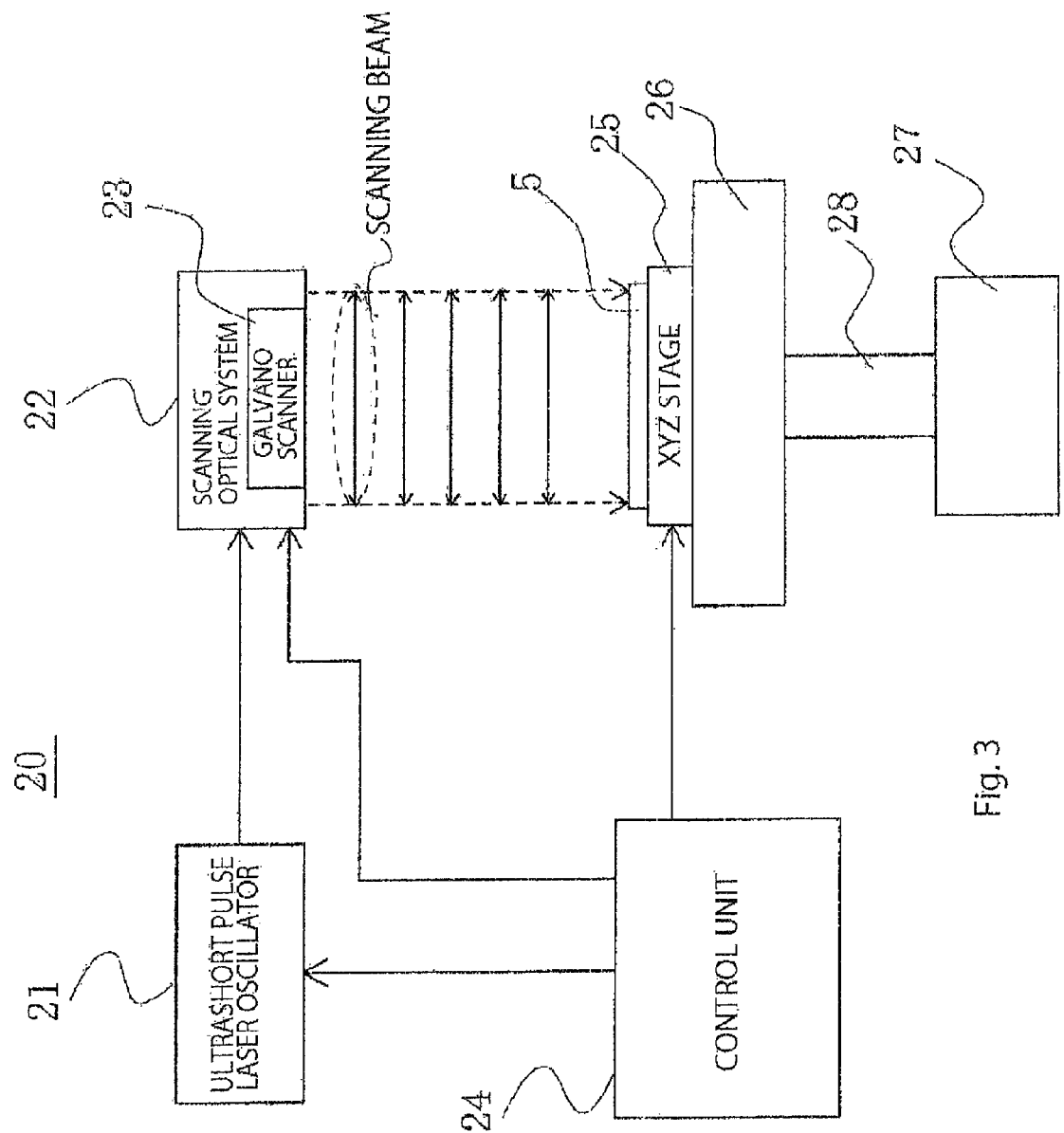
FIG. 3 is a schematic view illustrating an overview configuration of a processing device used in a processing step of the sealing face of the sliding part of the present invention.

It should be noted that FIG. 3 is a schematic view illustrating an overview configuration of a processing device 20 used in a processing step of the sealing face of the sliding part of the present invention.

The processing device 20 includes an ultrashort pulse laser oscillator 21 that oscillates the ultrashort pulse laser, a scanning optical system 22 that irradiates the ultrashort pulse laser to a predetermined position of the stationary ring 5 serving as an object to be processed, a control unit 24, an XYZ stage 25, a base 26, and an elevating member 27. In this example, the scanning optical system 22 includes a galvano scanner 23, and by scanning in one direction such as the X axis direction by the galvano scanner 23 and scanning in the Y axis direction by movement of the XYZ stage 25, a high-speed scanning property of the galvano scanner 23 is utilized. Therefore, the XYZ stage 25 may be movable at least in the Y and Z directions. The XYZ stage 25 is installed on an upper face of the base 26, and the stationary ring 5 serving as the object to be processed is mounted on the XYZ stage 25. The elevating member 27 is connected to the base 26 via a shaft 28.

An ultrashort pulse laser beam generated from the ultrashort pulse laser oscillator 21 enters the scanning optical system 22. The scanning optical system 22 forms the ultrashort pulse laser beam into a desired beam shape and focuses the beam on a predetermined position on a surface of the stationary ring 5 serving as the object to be processed on the XYZ stage 25. Material of the stationary ring 5 serving as the object to be processed is for example, SiC, Al2O3, ceramics, cemented carbide, stainless, or the like. In this example, SiC is used as the stationary ring 5 serving as the object to be processed.

The control unit 24 functions as a control device that controls drive of the ultrashort pulse laser oscillator 21, the scanning optical system 22, and the XYZ stage 25. That is, the control unit 24 outputs a drive signal to the ultrashort pulse laser oscillator 21, the scanning optical system 22, and the XYZ stage 25. The ultrashort pulse laser oscillator 21 generates the ultrashort pulse laser based on a fluence and pulse width instructed by the drive signal from the control unit 24, and irradiates the laser to an exterior of the device. Specifically, by the drive signal from the control unit 24, drive of constituent elements such as a diffraction grating, a prism, and a light shielding filter in the ultrashort pulse laser oscillator 21 is controlled.

In this example, the ultrashort pulse laser oscillator 21 uses a light source in which repetition frequency of the pulse is changeable to 5 kHz or more, a laser wavelength is changeable to 1,030 nm or 515 nm, and the pulse width is changeable to less than 20 picoseconds.

Next, actions of the above processing device 20 will be described.

Firstly, basic parameters of the ultrashort pulse laser beam to be irradiated are set by using the control unit 24. Setting of the basic parameters may be inputted for example by using an input device provided in the control unit 24. The basic parameters to be inputted include for example, the fluence, the pulse width, and the shot number. However, these basic parameters may be automatically calculated by an application program provided in the control unit 24. Based on the obtained basic parameters, the control unit 24 outputs the drive signal to the ultrashort pulse laser oscillator 21.

When the ultrashort pulse laser oscillator 21 receives the drive signal from the control unit 24, the ultrashort pulse laser oscillator 21 generates and outputs a laser beam at a fluence and pulse width designated by the drive signal. The ultrashort pulse laser beam generated from the ultrashort pulse laser oscillator 21 enters the scanning optical system 22, and the scanning optical system 22 forms the ultrashort pulse laser beam into a desired beam shape and focuses the beam on the predetermined position on the surface of the stationary ring 5 serving as the object to be processed on the XYZ stage 25. When laser irradiation at one certain point reaches the designated shot number, the galvano scanner 23 and the XYZ stage 25 are driven, so that the ultrashort pulse laser and the stationary ring 5 serving as the object to be processed are relatively moved. Thereby, the laser can be irradiated to plural positions of the stationary ring 5 serving as one object to be processed.

FIG. 4 illustrates a processing test result of each of the basic parameters. A picosecond laser in which the wavelength of the ultrashort pulse laser is 1,030 nm and the pulse width is 10 ps or less is used.

FIG. 5 illustrates a processing test result of each of the basic parameters. A picosecond laser in which the wavelength of the ultrashort pulse laser is 515 nm and the pulse width is 10 ps or less is used.

FIG. 6 is a graph illustrating an evaluation result of a state of a processing face at the time of processing at an irradiation fluence and a bulge at the edge of the processing part in a case where the wavelength of the ultrashort pulse laser is 1,030 nm and 515 nm. Evaluated items are (1) the state of the processing face and a state of the bulge due to the debris at the edge of the processing part. In FIG. 6, the state of the processing face is acceptable in a case where roughness Ra of the processing face (indicating the bottom faces of the positive pressure generation groove and the negative pressure generation groove. The same will be applied hereinafter.) is $1/10$ or less of processing depth, and not acceptable in the other cases. The bulge at the edge of the processing part is acceptable in a case where the bulge due to the debris at the edge of the processing part (at the edge of the positive pressure generation groove and the negative pressure generation groove) is less than 0.01 µm, and not acceptable in the other cases.

In FIG. 6, in a case where the wavelength of the ultrashort pulse laser is 1,030 nm, regarding the state of the processing face, the roughness Ra is $1/10$ or less of the processing depth at the fluence of 0.5, 1, 2, 3, 5, 7. Regarding the state of the bulge at the edge of the processing part, the bulge is less than 0.01 µm at the fluence of 0.1, 0.2, 0.4, 0.5, 1, 2, 3, 5, 7, 8, 9, 10, 30.

In a case where the wavelength of the ultrashort pulse laser is 515 nm, regarding the state of the processing face, the roughness Ra is $1/10$ or less of the processing depth at the fluence of 0.5, 1, 2, 3, 5, 7. Regarding the state of the bulge at the edge of the processing part, the bulge is less than 0.01 µm at the fluence of 0.1, 0.2, 0.4, 0.5, 1, 2, 3, 5, 7, 8, 9.

From the above results, it becomes clear that the energy fluence of the ultrashort pulse laser used in the processing step is favorable within a range from 0.5 J/(cm²·pulse) to 7 J/(cm²·pulse).

Figure 7:
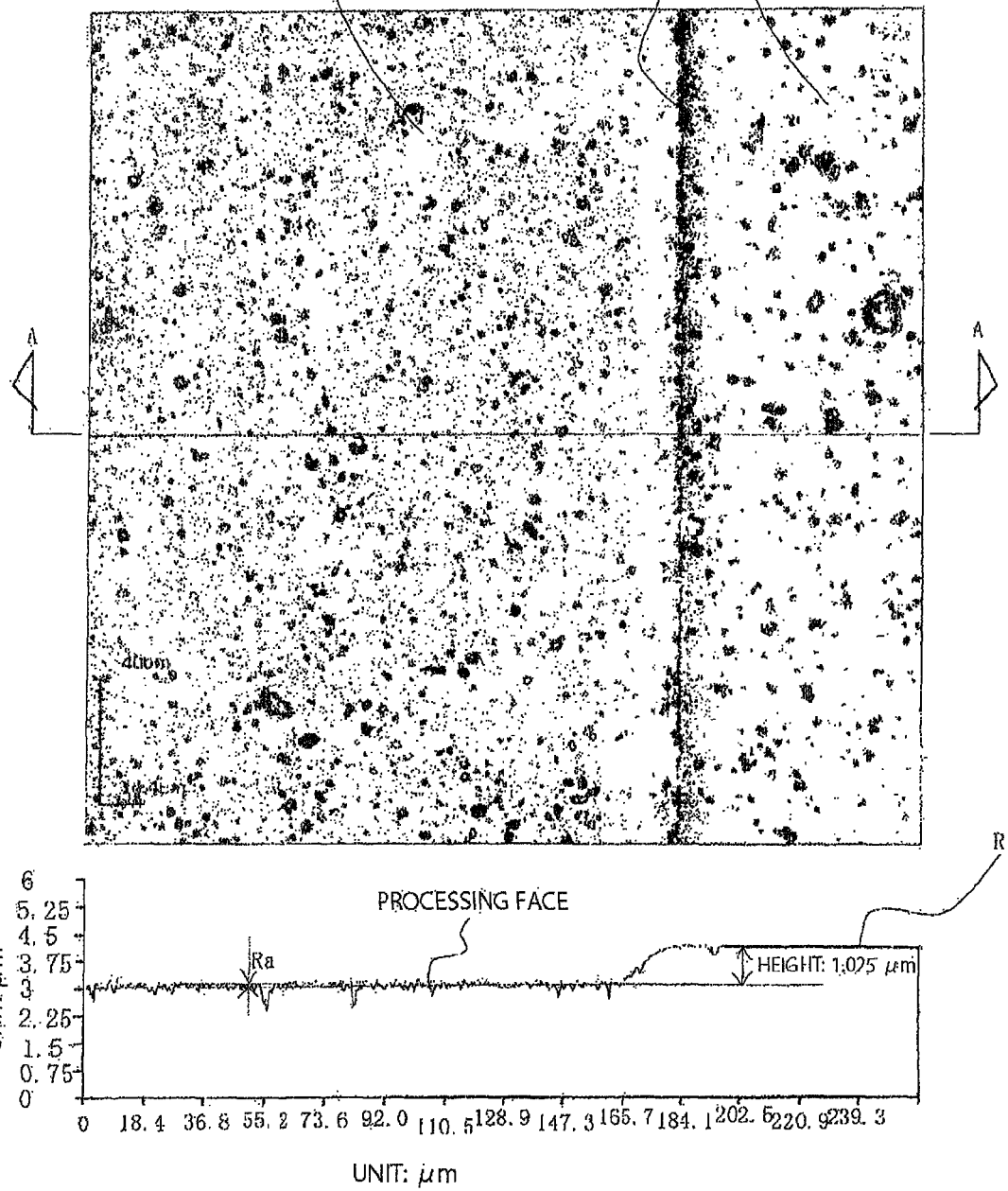
FIG. 7 illustrates a state of the processing face in a case where processing is performed by using a picosecond laser as the ultrashort pulse laser.

FIG. 7 illustrates a state of the processing face in a case where processing is performed by using the picosecond laser as the ultrashort pulse laser. FIG. 7(a) shows a microscope photograph of the processing face, and FIG. 7(b) illustrates an A-A section of FIG. 7(a) showing roughness of the processing face. It should be noted that the wavelength of the used ultrashort pulse laser is 1,030 nm, the energy fluence is 2.5 J/(cm²·pulse), and the processing depth of one shot is 0.02 µm.

From FIG. 7(b), the depth of the processing face (indicating the bottom faces of the positive pressure generation groove and the negative pressure generation groove. The same will be applied hereinafter.) is 1.025 µm, and the roughness Ra of the processing face is about 0.03 µm. The face roughness Ra of the processing face is about $3/100$ of the processing depth, which is sufficiently smaller than $1/10$ of the processing depth. The bulge due to the debris at the edge of the processing part (at the edge of the positive pressure generation groove and the negative pressure generation. groove) is as extremely small as 0.01 µm.

Figures 8A, 8B:
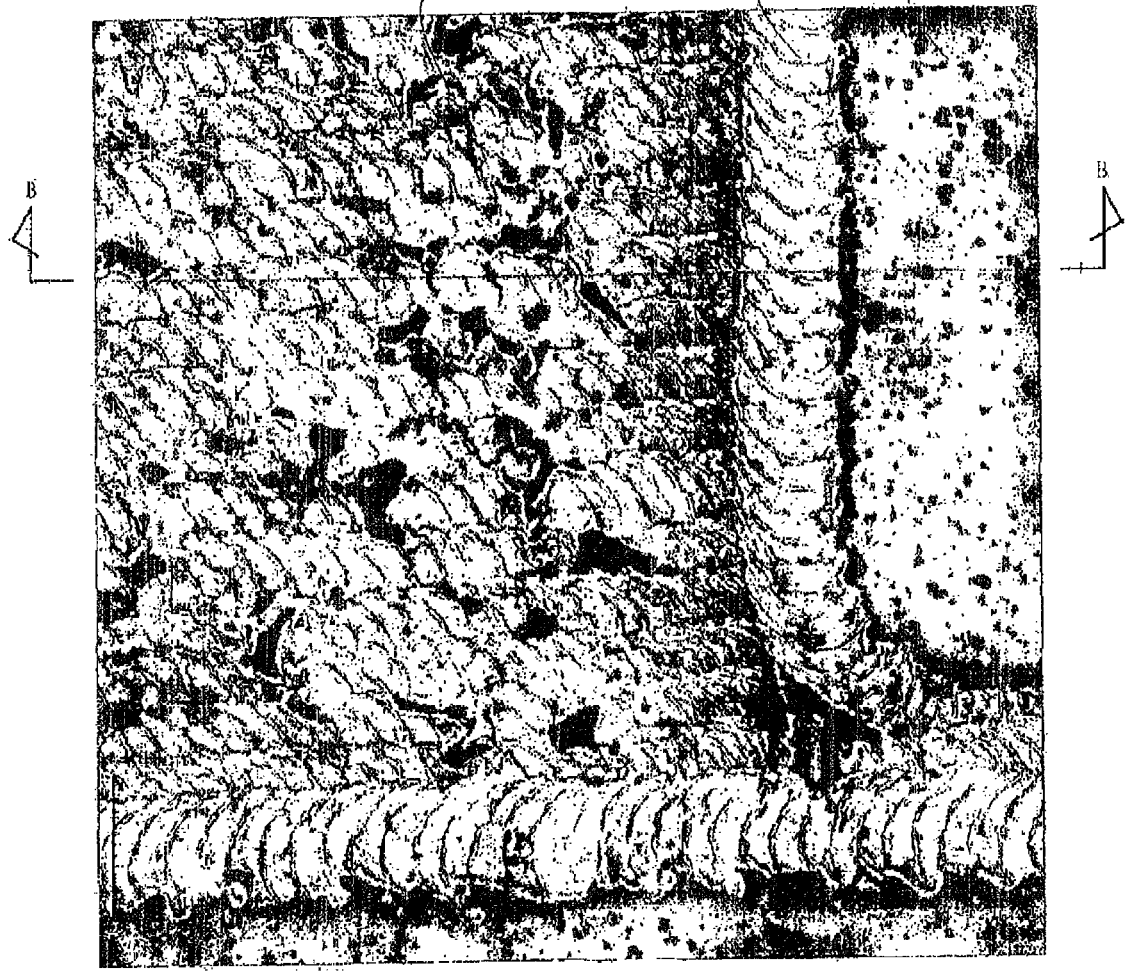
FIG. 8(a) shows a microscope photograph of the processing face.

FIG. 8 illustrates a state of the processing face in a case where processing is performed by using a nanosecond laser as the pulse laser. FIG. 8(a) shows a microscope photograph of the processing face, and FIG. 8(h) illustrates a B-B section of FIG. 8(a) showing roughness of the processing face.

From FIG. 8(b), the roughness Ra of the processing face (the bottom faces of the positive pressure generation groove and the negative pressure generation groove) is about 0.75 µm. The bulge due to the debris at the edge of the processing part (at the edge of the positive pressure generation groove and the negative pressure generation groove) is about 0.784 µm.

From the above description, the state of the processing face in a case where processing is performed by using the nanosecond laser, the roughness Ra of the processing face (the bottom faces of the positive pressure generation groove and the negative pressure generation groove) is about 25 times and the bulge due to the debris at the edge of the processing part (at the edge of the positive pressure generation groove and the negative pressure generation groove) is about 78 times more than those of the state of the processing face in a case where processing is performed by using the picosecond laser.

Second Embodiment

Figure 9:
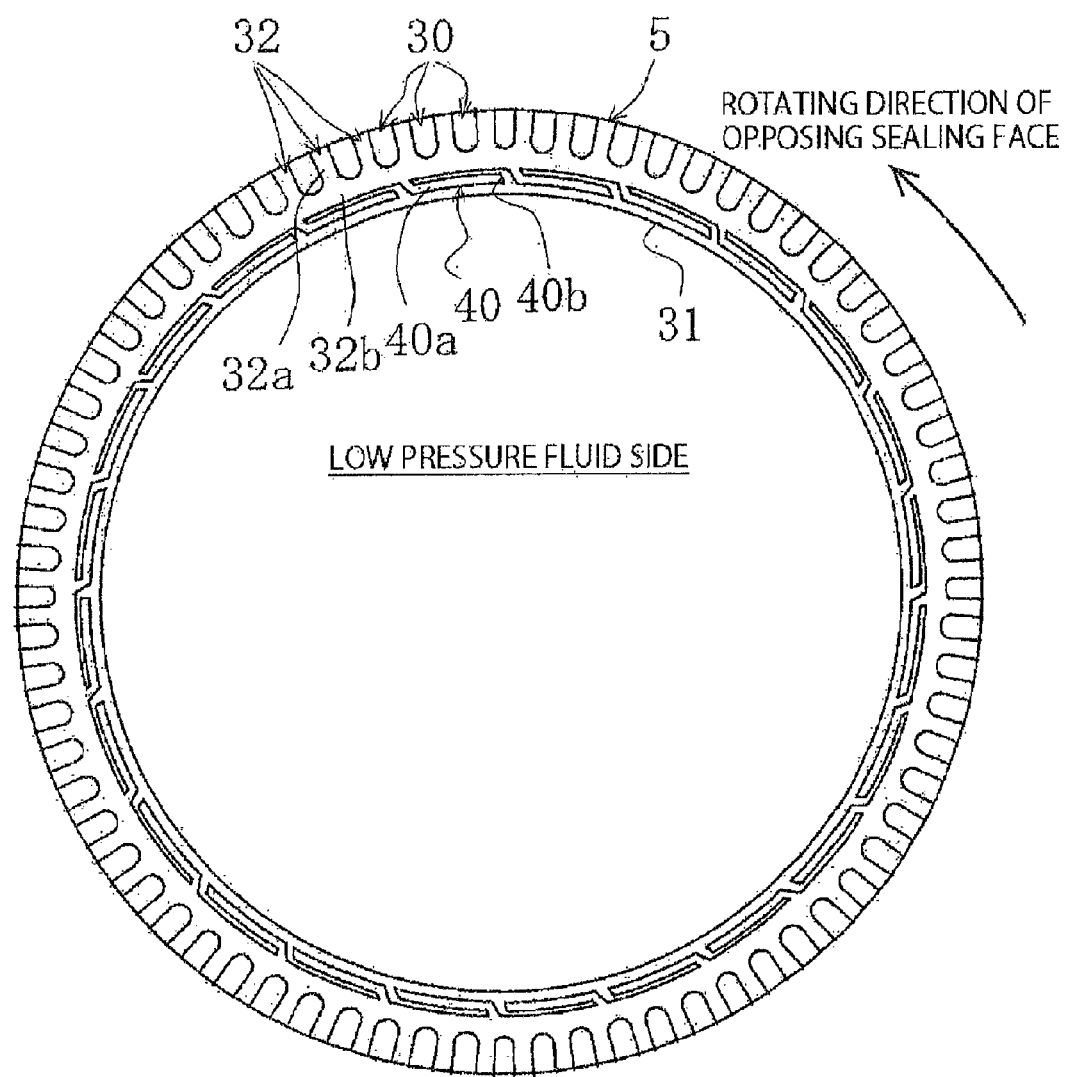
FIG. 9 illustrates a sealing face of a sliding part according to a second embodiment of the present invention.

With reference to FIG. 9, sliding parts according to a second embodiment of the present invention will be described.

In FIG. 9, the outer peripheral side of the sealing face of the stationary ring 5 serves as the high pressure fluid side (sealed fluid side), and the inner peripheral side serves as the low pressure fluid side for example the atmosphere side. The opposing sealing face is rotated anti-clockwise.

On the sealing face of the stationary ring 5, land sections 30 for generating dynamic pressure are provided to face the high pressure fluid side and a seal area 31 is provided to face the low pressure fluid side. The seal area 31 is a part formed by a smooth section of the sealing face, the part that performs a tightly sealing operation. The land sections 30 and the seal area 31 are arranged and separated from each other in the radial direction. A part of the sealing face excluding the land sections 30 and the seal area 31 is formed to be lower than faces of the land sections and the seal area. This low part forms fluid communication passages/positive pressure generation grooves 32.

In FIG. 9, the plurality of land sections 30 is provided at equal intervals in the circumferential direction, and the land sections 30 are separated from each other to be independent. A plurality of radial fluid communication passages/positive pressure generation grooves 32*a* is formed to face the high pressure fluid side, each of the radial fluid communication passages/positive pressure generation grooves being placed between the adjacent land sections 30 and 30. A circumferential fluid communication passage/positive pressure generation groove 32*b* is formed between the land sections 30 and the seal area 31, and the plurality of radial fluid communication passages/positive pressure generation grooves 32*a* communicates with each other via the circumferential fluid communication passage/positive pressure generation groove 32*b*. Circumferential width of each of the land sections 30, width of the radial fluid communication passages/positive pressure generation grooves 32*a* and the circumferential fluid communication passage/positive pressure generation groove 32*b*, and depth of these fluid communication passages/positive pressure generation grooves 32*a* and 32*b* are set to have optical values based on relative speed of the sealing faces, viscosity of the sealed fluid, or the like. One example will be described. The circumferential width of the land section 30 is on the order of millimeter, and the circumferential width of the fluid communication passages/positive pressure generation grooves 32*a* is equal to or smaller than the width of the land section 30. The surface of the land section 30 is at the substantially same height as the seal area 31. These fluid communication passages/positive pressure generation grooves 32*a* and 32*b* are set to be lower than the seal area 31 for example by 0.05 μm to 5 μm. When the depth of the fluid communication passages/positive pressure generation grooves 32*a* and 32*b* is 1 μm or more, high dynamic pressure is generated at the time of high speed rotation and a gap between the sealing faces is excessively increased, so that leakage is caused. Thus, the depth is preferably 1 μm or less.

Negative pressure generation mechanisms 40 are provided on the high pressure fluid side of the seal area 31 provided on the low pressure fluid side. In a case of FIG. 9, each of the negative pressure generation mechanisms 40 is formed from a reversed Rayleigh step mechanism. This reversed Rayleigh step mechanism includes a groove 40*a* formed on the seal area 31 and a reversed Rayleigh step 40*b* on an upstream side of the groove 40*a*, and a downstream side of the groove 40*a* communicates with the circumferential fluid communication passage/positive pressure generation groove 32*b*. Depth of the groove 40*a* is desirably formed to be the same as or slightly shallower than the depth of the circumferential fluid communication passage/positive pressure generation groove 32*b*. The plurality of reversed Rayleigh step mechanisms 40 is provided at equal intervals in the circumferential direction.

Now, when the rotating ring 3 is rotated and the sealing faces S of the rotating ring 3 and the stationary ring 5 relatively slide on each other, pressure of the fluid coming into the radial fluid communication passages/positive pressure generation grooves 32*a* from the high pressure fluid side is boosted by a dynamic pressure generation operation of the land sections 30, and positive pressure is generated. Thus, the gap between the sealing faces S of the rotating ring 3 and the stationary ring 5 is increased, so that a lubricating property of the sealing faces S is improved. At the time, impurities contained in the fluid go round the circumferential fluid communication passage/positive pressure generation groove 32*b*, and is discharged to the high pressure fluid side by centrifugal force at the end. Thus, the sealing faces are not damaged. Since the impurities are not accumulated on the sealing faces to increase the gap between the sealing faces, the life of the sliding parts can be remarkably improved.

Further, the negative pressure generation mechanisms 40 are provided on the high pressure fluid side of the seal area 31 provided on the low pressure fluid side. Thus, the fluid to be leaked out from the sealing faces and the fluid communication passages/positive pressure generation grooves 32 to the low pressure fluid side flows into the negative pressure generation mechanisms 40 and is discharged to the high pressure fluid side via the fluid communication passages/positive pressure generation grooves 32. Thus, leakage of the fluid can be reduced.

In a case of FIG. 9, an outline of the land section 30 is an U shape, and the land section is arranged in such a manner that an upper part of the U shape faces the high pressure fluid side.

In such a way, in a case where the outline of the land section 30 is a U shape, a dynamic pressure generation part is elongated in the radial direction. Thus, the lubricating property is improved with lowered friction. Since the radial fluid communication passages/positive pressure generation grooves 32*a* and the circumferential fluid communication passage/positive pressure generation groove 32*b* smoothly communicate with each other in an arc shape, the impurities contained in the fluid are discharged without stagnation in the middle. Thus, accumulation of the impurities can be prevented. As a result, since the sealing faces are not damaged, corrosion of the sealing faces can be prevented.

In this second embodiment, the fluid communication passages/positive pressure generation grooves 32 and the grooves 40*a* of the reversed Rayleigh step mechanisms are processed by the same processing method as the positive pressure generation grooves 11*a* and the negative pressure generation grooves 15*a* of the first embodiment, that is, processed within a range of the energy fluence of the ultrashort pulse laser from 0.5 J/(cm$^2$·pulse) to 7 J/(cm$^2$·pulse) by using the processing device 20 of FIG. 3. Thus, the description thereof will be omitted.

In the present invention, the sliding parts made of SiC or the like are processed by using the ultrashort pulse laser in which the pulse width is extremely short. Thus, a temperature around a region to which the ultrashort pulse laser is irradiated is less easily increased than a case where the conventional nanosecond laser is irradiated. This is because generation of heat by one pulse in the ultrashort pulse laser is extremely small in comparison to a normal nanosecond laser. Therefore, while the part to which the ultrashort pulse laser is irradiated is removed by ablation by the irradiation of the laser to form a flat groove, a bulge is not caused at an edge of the groove by debris due to the irradiation of the laser, so that an extremely fine processing face can be obtained. In particular, by controlling the energy fluence of the ultrashort pulse laser, an extremely flat processing face and a highly precise groove without any bulge due to debris at a processing edge can be accurately formed.

Since the ultrashort pulse laser is used for processing as described above, an influence of heat on peripheral parts of the irradiation region of the laser can be extremely reduced. Therefore, generation of a problem that the temperature around the laser irradiation region on the sealing faces of the sliding parts made of SIC or the like is increased due to the irradiation of the laser and an undulation is generated on the sealing faces by the influence of heat can be suppressed. Processing of groove depth of 0.05 μm to 5 μm cannot be processed in conventional mechanical processing. Further, there is a problem that known ion milling takes time for processing and etching takes both time and cost.

In processing of the present invention in which the ultrashort pulse laser is used, by setting the energy fluence within a range from 0.5 J/(cm$^2$·pulse) to 7 J/(cm$^2$·pulse), an extremely flat processing face and a highly precise sealing face without any bulge due to debris at a processing edge can be obtained, and working efficiency is also favorable.

When the energy fluence is 8 J/(cm$^2$·pulse) or more, pulse energy of one shot is too large. Thus, the processing face is roughened and the roughness Ra is increased.

Further, when the energy fluence is 50 J/(cm$^2$·pulse) or more with the wavelength of 1,030 nm, and when the energy fluence is 10 J/(cm$^2$·pulse) or more with the wavelength of 515 nm, the debris is generated and the bulge is caused at the edge of the processing part.

In a case where the sliding parts are formed from any one material of SiC, Al2O3, ceramics, cemented carbide, and stainless, the energy fluence of the ultrashort pulse laser is preferably within a range from 0.5 J/(cm$^2$·pulse) to 7 J/(cm$^2$·pulse).

The processing method of the sliding parts may further include a step of changing the energy fluence of the ultrashort pulse laser. The step of changing the energy fluence may include a step of changing at least any of pulse energy of the ultrashort pulse laser and focal length. It should be noted that the focal length is a distance from the center of a lens arranged at a position nearest to the sealing face in an optical system for irradiating the ultrashort pulse laser to the sealing face to a position where the ultrashort pulse laser passing through the lens is focused.

Next, with reference to FIG. 10, the positive pressure generation mechanism formed from the Rayleigh step mechanism or the like and the negative pressure generation mechanism formed from the reversed Rayleigh step mechanism or the like will be described.

In FIG. 10(a), the rotating ring 3 and the stationary ring 5 serving as the opposing sliding parts relatively slide on each other as shown by arrows. For example, the Rayleigh step 11b is formed on the sealing face of the stationary ring 5 so as to be perpendicular to the relative movement direction and facing the upstream side, and the groove section 11a serving as the positive pressure generation groove is formed on the upstream side of the Rayleigh step 11b. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to a viscous property thereof. Thus, at the time, positive pressure (dynamic pressure) as shown by broken lines is generated due to existence of the Rayleigh step 11b.

It should be noted that the reference signs 10a, 10b respectively denote the inlet section and the outlet section of the fluid circulation groove, and the reference sign R denotes the land section.

In FIG. 10(b), the rotating ring 3 and the stationary ring 5 serving as the opposing sliding parts also relatively slide on each other as shown by arrows. However, the reversed Rayleigh step 15b is formed on the sealing faces of the rotating ring 3 and the stationary ring 5 so as to be perpendicular to the relative movement direction and facing the downstream side, and the groove section 15a serving as the negative pressure generation groove is formed on the downstream side of the reversed Rayleigh step 15b. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to the viscous property thereof. Thus, at the time, negative pressure (dynamic pressure) as shown by broken lines is generated due to existence of the reversed Rayleigh step 15b.

It should be noted that the reference signs 10a, 10b respectively denote the inlet section and the outlet section of the fluid circulation groove, and further, the reference sign R denotes the land section.

The embodiments of the present invention are described above with the drawings. However, specific configurations are not limited to these embodiments but modifications and additions that are made within the range not departing from the gist of the present invention are also included in the present invention.

For example, although the example that the sliding parts are used for any of a pair of rotating and stationary sealing rings in a mechanical seal device is mainly described in the above embodiments, the sliding parts can also be utilized as sliding parts of a bearing that slides on a rotating shaft while sealing lubricating oil on one side in the axial direction of a cylindrical sealing face.

In addition, for example, although the so-called inside type where the high-pressure sealed fluid exists on the outer peripheral side is described in the above embodiments, the present invention can also be applied to a so-called outside type where the high-pressure fluid exists on the inner peripheral side as a matter of course. In this case, the land sections for generating dynamic pressure and the seal area are arranged reversely in the radial direction.

In addition, for example, although the case where the fluid circulation grooves, the positive pressure generation grooves, and the negative pressure generation grooves, or the land sections for generating dynamic pressure, the fluid communication passages/positive pressure generation grooves, and the seal area are provided on the sealing face of the stationary ring is described in the above embodiments, the present invention is not limited to this but these may be provided on the sealing face of the rotating ring.

REFERENCE SIGNS LIST

1 Rotating shaft
2 Sleeve
3 Rotating ring
4 Housing
5 Stationary ring
6 Coiled wave spring
7 Bellows
10 Fluid communication passage
11 Positive pressure generation mechanism
11a Positive pressure generation groove
11b Rayleigh step
15 Negative pressure generation mechanism
15a Negative pressure generation groove
15b Reversed Rayleigh step
20 Processing device
21 Ultrashort pulse laser oscillator
22 Scanning optical system
23 Galvano scanner 24 Control unit
25 XYZ stage
26 Base
27 Elevating member
28 Shaft
30 Land section
31 Seal area
32 Fluid communication passage/positive pressure generation groove
40 Negative pressure generation mechanism
40a Groove (negative pressure generation groove)
40b Reversed Rayleigh step
R Land section

The invention claimed is:

1. A pair of sliding parts comprising sealing faces that relatively slide on each other, wherein:
a fluid circulation groove including an inlet section where a fluid comes in from a high pressure fluid side, an outlet section where the fluid goes out to the high pressure fluid side, and a communication section that provides communication between the inlet section and the outlet section is provided in the sealing face on one side;
the fluid circulation groove is isolated from a low pressure fluid side by a land section;
a positive pressure generation mechanism having a position pressure generation groove shallower than the fluid circulation groove is provided in a part surrounded by the fluid circulation groove and the high pressure fluid side;
the positive pressure generation groove communicates with the inlet section and is isolated from the outlet section and the high pressure fluid side by the land section;
the positive pressure generation groove is a shallow groove within a range of depth from 0.05 μm to 5 μm formed by irradiation of an ultrashort pulse laser; and
a bulge due to debris at an edge of a processing part is less than 0.01 μm.

2. The sliding parts as set forth in claim 1, wherein:
a negative pressure generation mechanism including a negative pressure generation groove shallower than the fluid circulation groove is provided on an outside of the part of the sealing face on one side surrounded by the fluid circulation groove and the high pressure fluid side;
the negative pressure generation groove communicates with the inlet section and is isolated from the outlet section and the low pressure fluid side by the land section;
the negative pressure generation groove is a shallow groove within a range of depth from 0.05 μm to 5 μm formed by the irradiation of the ultrashort pulse laser; and
a bulge due to debris at an edge of a processing part is less than 0.01 μm.

3. The sliding parts as set forth in claim 2, wherein a roughness Ra of a bottom face of the negative pressure generation groove is 1/10 or less of the laser processing depth.

4. The sliding parts as set forth in claim 1, wherein a roughness Ra of a bottom face of the positive pressure generation groove is 1/10 or less of the laser processing depth.

5. A pair of sliding parts comprising sealing faces that relatively slide on each other, wherein:
a land section for generating dynamic pressure is provided to face a high pressure fluid side and a seal area is provided to face a low pressure fluid side in the sealing face on one side;
the land section and the seal area are arranged and separated from each other in a radial direction;
a part of the sealing face excluding the land section and the seal area is formed to be lower than faces of the land section and the seal area as a fluid communication passage/positive pressure generation groove;
the fluid communication passage/positive pressure generation groove is a shallow groove within a range of depth from 0.05 μm to 5 μm formed by irradiation of an ultrashort pulse laser; and
a bulge due to debris at an edge of a processing part is less than 0.01 μm.

6. The sliding parts as set forth in claim 5, wherein:
a negative pressure generation mechanism including a negative pressure generation groove is provided on the high pressure fluid side of the seal area;
a downstream side of the negative pressure generation groove communicates with the fluid communication passage/positive pressure generation groove;
the negative pressure generation groove is a shallow groove within a range of depth from 0.05 μm to 5 μm formed by the irradiation of the ultrashort pulse laser; and
a bulge due to debris at an edge of a processing part is less than 0.01 μm.

7. The sliding parts as set forth in claim 6, wherein a roughness Ra of a bottom face of the negative pressure generation groove is 1/10 or less of the laser processing depth.

8. The sliding parts as set forth in claim 3, wherein a roughness Ra of a bottom face of the fluid communication passage/positive pressure generation groove is 1/10 or less of the laser processing depth.

* * * * *